United States Patent Office 3,047,593
Patented July 31, 1962

3,047,593
PREPARATION OF A 3-AMINO-ANDROSTANE COMPOUND
Willem Jacob van der Burg, Oss, Netherlands, assignor to Organon Inc., West Orange, N.J., a corporation of New Jersey
No Drawing. Filed Feb. 2, 1962, Ser. No. 170,818
Claims priority, application Netherlands Feb. 13, 1961
3 Claims. (Cl. 260—397.5)

The invention relates to a process for the preparation of the 3α-amino-17β-acetoxy-5α-androstane, the 3α-amino group of which bears a protecting group, by oxidation of the 3α-amino-20-keto-5α-pregnane, the amino group of which is protected, with a peracid.

Some years ago it was found that from the leaves of Funtumia latifolia a steroid compound can be obtained of the empirical formula: $C_{21}H_{35}ON$. The structure of this steroid compound, called funtumine, proves to be that of the 3α-amino-20-keto-5α-pregnane.

As this compound can be isolated from said plant in reasonable quantities and has such a structure as to be suitable for further conversions, the funtumine is a very important compound which like the sapogenines obtained from plants may be applied as starting product for the preparation of all kinds of biologically active steroids.

In Bull. Soc. Chim. France, pp. 1640–1643 (1960), M. M. Janot et al. describe a method by which the present 3α-amino-20-keto-5α-pregnane is converted into the corresponding 17β-acetoxy-compound, after protection of the 3-amino group, by means of a peracid. After saponification the 3α-amino-17β-hydroxy-5α-androstane is obtained from it, which is subsequently converted into the 3-keto-17β-hydroxy-5α-androstane by replacing the amino group by a keto group, for example by the known method of Ruschig.

Last-mentioned compound can be converted in a simple manner into aromatic steroids, such as oestradiol and oestrone, by converting the 3-keto-17β-hydroxy-5α-androstane, for example by means of seleniumdioxide, into the corresponding $\Delta^{1,4}$-3-keto-compound and aromatising the thus obtained compound in ring A by heating in the presence of tetralin. In their turn these aromatic steroids can be converted again in a known manner into important 19-nor-steroids, such as 19-nor-testosterone and the corresponding 3-desoxy compound.

From the above it appears that the funtumine may be a very important starting product for the preparation of in ring A aromatic and 19-nor-steroids. The value of the funtumine, however, is largely determined by the fact whether this vegetable product can be oxidised in a profitable manner into the corresponding 17β-acetoxy-5α-androstane compound.

In the afore-said article in Bull. Soc. Chim. France perbenzoic acid or trifluoroperacetic acid is used for that purpose.

When using perbenzoic acid only a yield of 40–45% of the desired 17β-acetoxy-5α-androstane is obtained.

Moreover this peracid requires a reaction period of 8 days, which is a very great obstacle in the conversion of funtumine on a factory scale to, for example, oestradiol.

When using trifluoroperacetic acid a shorter reaction period is sufficient indeed, but besides the fact that this reagent is very expensive it also gives a yield of about 60% only.

Surprisingly it was found now that after protection of the 3-amino group the funtumine can be converted into the corresponding 17β-acetoxy-5α-androstane compound, in a yield of about 80%, by oxidation with performic acid.

Apart from the advantage that in this way a considerable improvement in the yield is obtained of 40–35% or 20% as compared with the oxidation with perbenzoic acid or trifluoro-peracetic acid, the process according to the invention also allows the use of an easily accessible and cheap reagent.

The present process can be carried out by mixing the relative 3α-amino-20-keto-5α-pregnane, the amino group of which is temporarily protected, with formic acid and adding hydrogen peroxide to it.

The protection of the amino group can be effected by acylating this group, for example with acetic acid anhydride or trifluoroacetic acid anhydride.

A better method for the protection of the 3-amino group is described in the Netherlands patent application No. 261,365. According to this method a protecting group is introduced by reacting the funtumine with a halogen formic acid ester.

Furthermore a small amount of a strong organic or inorganic acid is preferably added to the reaction mixture, which mixture may contain a suitable organic solvent, if possible, in order to raise the yield and reduce the reaction period. As acids may be used sulphuric acid, perchloric acid, para-toluenesulphonic acid and nitrobenzenesulphonic acids.

The reaction period amounts to 20–65 hours, conditional upon the temperature and presence of a strong acid. The reaction temperature is preferably below 45° C. and usually varies between 10 and 40° C.

The invention is further illustrated by the following examples.

*Example I*

To a solution of 3.2 g. of 3α-carbo-ethoxy-amino-20-keto-5α-pregnane in 25 ml. of 98% formic acid are added 3 ml. of 40% hydrogen peroxide. The mixture is kept at room temperature for 58 hours, after which 8 ml. of water are added gently. The crystallisate formed is sucked off, washed with 40% formic acid, next with water and finally dried in vacuo to obtain 2.71 g. (that is 81% of the theory) 3α-carbo-ethoxy-amino-17β-acetoxy-5α-androstane with the melting point of 167–169° C.

*Example II*

2 g. of N-acetyl-funtumine are dissolved in 16 ml. of 100% formic acid, after which 1.8 ml. of 40% hydrogen peroxide are added. The mixture is kept at room temperature for 55 hours, after which 5 ml. of water are added. After that the mixture is left to stand for another half hour, after which the crystallisate formed is sucked off, washed with 40% formic acid and dried in vacuo to obtain 16.8 g. of 3α-acetamide-17β-acetoxy-5α-androstane with the melting point of 183–185° C.

*Example III*

To a solution of 6 g. of 3α-carbo-ethoxy-amino-20-keto-5α-pregnane in 38 ml. of 98% formic acid are added 250 mg. of 2,4-dinitro-benzenesulphonic acid and subsequently 4 ml. of 80% hydrogen peroxide. The mixture is kept at room temperature for 24 hours, after which 12 ml. of water are added dropwise with stirring. After stirring for 15 minutes the crystallisate is sucked off, washed with 50% formic acid, next with water until neutral and then dried in vacuo to obtain 4.88 g. of 3α-carbo-ethoxy-amino-17β-acetoxy-5α-androstane with the melting point of 168–170° C.

*Example IV*

A mixture of 3.6 g. of 3α-carbo-sec.butyloxy-amino-20-keto-5α-pregnane, 24 ml. of 98% formic acid, 4 ml. of 40% hydrogen peroxide and three drops of a 30% perchloric acid are kept at room temperature for 24 hours and next treated further in accordance with the process described in Example I to obtain the 3α-carbo-sec.butyl-oxy-amino-17α-acetoxy-5α-androstane in a yield of 3.1 g.=80.8% of the theory.

The thus obtained product is boiled for 4 hours in the presence of a solution of 2.24 g. of potassium hydroxide in 10 ml. of 90% methanol. Then the mixture is evaporated until nearly dry and next diluted with two parts of water. The mixture is kept at room temperature for 30 minutes, filtered and washed with water until neutral to obtain 2.05 g. of 3α-amino-17β-hydroxy-5α-androstane (melting point 173-174° C.), corresponding with 98.8% of the theory.

I claim:

1. Process for the preparation of 3α-amino-17β-acetoxy-5α-androstane, the 3-amino group of which is protected, by oxidation og 3α-amino-20-keto-5α-pregnane, the 3-amino group of which is protected, with performic acid.

2. Process according to claim 1, characterized in that the oxidation is carried out with performic acid in the presence of a strong acid selected from the group consisting of an organic and inorganic acid and at a temperature below 45° C.

3. Process according to claim 2, characterized in that a compound selected from the group consisting of the N-acyl-derivative of 3α-amino-20-keto-5α-pregnane and the N-carboxy ester of 3α-amino-20-keto-5α-pregnane is oxidized with performic acid in the presence of hydrogen peroxide and a strong acid.

No references cited.